(12) United States Patent
Shim et al.

(10) Patent No.: US 11,861,014 B2
(45) Date of Patent: Jan. 2, 2024

(54) ELECTRONIC DEVICE DETECTING SOFTWARE VULNERABILITY AND METHOD FOR OPERATING SAME

(71) Applicant: SAMSUNG ELECTRONICS CO., LTD., Gyeonggi-do (KR)

(72) Inventors: Woochul Shim, Gyeonggi-do (KR); Sunwoo Kim, Gyeonggi-do (KR); Yongho Hwang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 511 days.

(21) Appl. No.: 17/059,768

(22) PCT Filed: May 3, 2019

(86) PCT No.: PCT/KR2019/005361
§ 371 (c)(1),
(2) Date: Nov. 30, 2020

(87) PCT Pub. No.: WO2019/231122
PCT Pub. Date: Dec. 5, 2019

(65) Prior Publication Data
US 2021/0209232 A1    Jul. 8, 2021

(30) Foreign Application Priority Data

May 30, 2018 (KR) .......................... 10-2018-0061641

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
None
See application file for complete search history.

(56) References Cited

U.S. PATENT DOCUMENTS 6,618,727 B1  9/2003 Wheeler et al.
6,658,626 B1  12/2003 Aiken
(Continued)

FOREIGN PATENT DOCUMENTS

KR       10-1568224      11/2015
WO     WO 2017/061270    4/2017

OTHER PUBLICATIONS

Seulbae Kim et al., "Software Systems at Risk: An Empirical Study of Cloned Vulnerabilities in Practice", Computers & Security 77, Feb. 27, 2018, 17 pages.
European Search Report dated Apr. 13, 2021 issued in counterpart application No. 19810278.2-1218, 23 pages.
Korean Office Action dated Jul. 28, 2022 issued in counterpart application No. 10-2018-0061641, 11 pages.
(Continued)

*Primary Examiner* — Fatoumata Traore
(74) *Attorney, Agent, or Firm* — The Farrell Law Firm, P.C.

(57) ABSTRACT

According to one or more embodiments, an electronic device comprises: a display device; a memory for storing at least one source code and a comparison file including any one of a modification and a vulnerability, in which each of at least one character string included in a patch file corresponding to the at least one source code is classified; and a processor functionally connected to the memory and the display device, wherein the processor can be set to load the at least one source code stored in the memory, compare a character string included in the comparison file corresponding to the at least one source code with a character string included in the source code, and provide, through an output device, at least one piece of information from among pieces of information about whether the identified source code is patched, the probability that the source code is patched, and a vulnerability in the source code, on the basis of the result of the comparison.

15 Claims, 15 Drawing Sheets

(56) References Cited

U.S. PATENT DOCUMENTS

| | | | | |
|---|---|---|---|---|
| 9,792,443 | B1* | 10/2017 | Sheridan | G06F 21/563 |
| 10,534,914 | B2* | 1/2020 | Nakajima | G06F 21/563 |
| 10,650,150 | B1* | 5/2020 | Rajasooriya | G06N 7/01 |
| 10,659,150 | B1* | 5/2020 | Getzin | H04L 5/16 |
| 2007/0106978 | A1* | 5/2007 | Felts | G06F 8/71 |
| | | | | 717/124 |
| 2011/0185433 | A1 | 7/2011 | Amarasinghe et al. | |
| 2013/0111447 | A1 | 5/2013 | Amano et al. | |
| 2015/0207811 | A1 | 7/2015 | Feher et al. | |
| 2016/0188885 | A1* | 6/2016 | Lee | G06F 21/577 |
| | | | | 726/25 |
| 2016/0259636 | A1* | 9/2016 | Plate | G06F 8/658 |
| 2017/0019422 | A1 | 1/2017 | Makowski et al. | |
| 2017/0308380 | A1 | 10/2017 | Lee et al. | |

OTHER PUBLICATIONS

PCT/ISA/210 Search Report issued on PCT/KR2019/005361, dated Aug. 7, 2019, pp. 5.

PCT/ISA/237 Written Opinion issued on PCT/KR2019/005361, dated Aug. 7, 2019, pp. 4.

Jiyong Jang et al., "ReDeBug: Finding Unpatched Code Clones in Entire OS Distributions", 2012 IEEE Symposium on Security and Privacy, Jan. 1, 2012, pp. 15.

Seulbae Kim et al., "VUDDY: A Scalable Approach for Vulnerable Code Clone Discovery", 2017 IEEE Symposium on Security and Privacy, Jan. 1, 2017, pp. 20.

Zhen Li et al., "VulDeePecker: A Deep Learning-Based System for Vulnerability Detection", arXiv:1801.01681v1 [cs.CR] Jan. 5, 2018, pp. 15.

\* cited by examiner

```
@@ -84,10 +84,12 @@ static int length_from_afi(const unsigned afi)
 */
unsigned int X509v3_addr_get_afi(const IPAddressFamily *f)
{
-    return ((f != NULL &&
-             f->addressFamily != NULL && f->addressFamily->data != NULL)
-            ? ((f->addressFamily->data[0] << 8) | (f->addressFamily->data[1]))
-            : 0);
+    if (f == NULL
+        || f->addressFamily == NULL
+        || f->addressFamily->data == NULL
+        || f->addressFamily->length < 2)
+        return 0;
+    return (f->addressFamily->data[0] << 8) | f->addressFamily->data[1];
}
/*
```

[Patch for CVE-2017-3735] — 1011

↓ Snippet Extraction

```
-    return ((f != NULL &&
-             f->addressFamily != NULL && f->addressFamily->data != NULL)
-            ? ((f->addressFamily->data[0] << 8) | (f->addressFamily->data[1]))
-            : 0);
```
[Vulnerable code snippet] — 1012

```
+    if (f == NULL
+        || f->addressFamily == NULL
+        || f->addressFamily->data == NULL
+        || f->addressFamily->length < 2)
+        return 0;
+    return (f->addressFamily->data[0] << 8) | f->addressFamily->data[1];
```
[Patched code snippet] — 1013

100% Matched

1014

```
@@ -84,10 +84,12 @@ static int length_from_afi(const unsigned afi)
 */
unsigned int X509v3_addr_get_afi(const IPAddressFamily *f)
{
    return ((f != NULL &&
             f->addressFamily != NULL && f->addressFamily->data != NULL)
            ? ((f->addressFamily->data[0] << 8) | (f->addressFamily->data[1]))
            : 0);
}
/*
```
1015

0%

[Vulnerable Source code]

FIG.10B

```
@@ -602,12 +602,14 @@ int ssl23_get_client_hello(SSL *s)
     if ((type == 2) || (type == 3))
       {
       /* we have SSLv3/TLSv1 (type 2: SSL2 style, type 3: SSL3/TLS style) */
-     s->method = ssl23_get_server_method(s->version);
-     if (s->method == NULL)
+     const SSL_METHOD *new_method;
+     new_method = ssl23_get_server_method(s->version);
+     if (new_method == NULL)
         {
SSLerr(SSL_F_SSL23_GET_CLIENT_HELLO,SSL_R_UNSUPPORTED_PROTOCOL);
         goto err;
         }
+     s->method = new_method;

if (!ssl_init_wbio_buffer(s,1)) goto err;
```

[Patch for CVE-2014-3569] — 1031

↓ Snippet Extraction

```
-     s->method = ssl23_get_server_method(s->version);
-     if (s->method == NULL)
```
[Vulnerable code snippet] — 1032

```
+     const SSL_METHOD *new_method;
+     new_method = ssl23_get_server_method(s->version);
+     if (new_method == NULL)
      ...
+     s->method = new_method;
```
[Patched code snippet] — 1033

1034

100% Matched
```
if ((type == 2) || (type == 3))
  {
  /* we have SSLv3/TLSv1 (type 2: SSL2 style, type 3: SSL3/TLS style) */
    s->method = ssl23_get_server_method(s->version);
    if (s->method == NULL)
      {
SSLerr(SSL_F_SSL23_GET_CLIENT_HELLO,SSL_R_UNSUPPORTED_PROTOCOL);
      goto err;
      } if (!ssl_init_wbio_buffer(s,1)) goto err;
```
0%
[Vulnerable Source code] — 1035

FIG.10D

ELECTRONIC DEVICE DETECTING SOFTWARE VULNERABILITY AND METHOD FOR OPERATING SAME

CROSS-REFERENCE TO RELATED APPLICATION(S)

This application is a National Phase Entry of PCT international Application No. PCT/KR2019/005361, which was filed on May 3, 2019, and claims priority to Korean Patent Application No. 10-2018-0061641 filed on May 30, 2018, in the Korean Intellectual Property Office, the contents of each of which are incorporated herein by reference.

BACKGROUND

1. Field

The disclosure relates to an electronic device that detects software vulnerabilities and a method of operating the electronic device.

2. Description of the Related Art

In recent years, various types of open sources have been produced and released by developers, and application (or program) developers have been developing applications using open sources. The open sources may contain vulnerabilities. In the international organization for standardization (ISO) 27005, a vulnerability is defined as a weakness in an asset or a group of assets that may be exploited by one or more threats. IETF RFC2828 defines a vulnerability as a weakness in management, operation, implementation, or design that may be exploited to violate the security policy of a system.

Vulnerabilities may be caused by insufficient testing or insufficient inspection tracking. Vulnerabilities may occur for various reasons, such as design flaws, software bugs, and wrong source code writing. In recent years, vulnerabilities of various sources have been analyzed and disclosed. For example, the common vulnerability exposure or common vulnerability enumeration (CVE) provides information about vulnerabilities and their corrections. In addition, a corresponding open source provider or other providers provide patch files coping with vulnerabilities.

SUMMARY

As described above, as information about vulnerabilities and their corrections are provided, application developers may use the provided information to identify whether there is any vulnerability in open sources included in applications that they develop. Further, the application developers may correct sources having vulnerabilities by a patch file. However, when an application including a large-scale source code is created, multiple open sources may be included in the application. Accordingly, the application developers face limitations in manually identifying whether each open source includes a vulnerability or whether the open source is a patched version. Moreover, a technique of automatically identifying whether an open source included in an application is a patched version is yet to be developed.

Various embodiments are devised to solve the above or other problems, and may provide an electronic device that provides information indicating whether software included in an application contains a vulnerability, information indicating whether the software has been patched, and information about vulnerabilities in the software by comparing a comparison file of vulnerabilities or corrections obtained from a collected patch file with the source code of the application, and a method of operating the electronic device.

According to various embodiments, an electronic device includes an output device, a memory storing at least one source code and a comparison file including at least one of a correction or a vulnerability into which each of at least one character string included in a patch file corresponding to the at least one source code is classified, and a processor operatively coupled to the memory and the output device. The processor is configured to load the at least one source code stored in the memory, compare a character string included in the comparison file corresponding to the at least one source code with a character string included in the source code, and provide at least one of information indicating whether the source code has been patched, identified based on a result of the comparison, a probability that the source code has been patched, or information about a vulnerability in the source code through the output device.

According to various embodiments, a method of operating an electronic device includes storing at least one source code and a comparison file including at least one of a correction or a vulnerability into which each of at least one character string included in a patch file corresponding to the at least one source code is classified, loading the at least one source code stored in a memory of the electronic device, comparing a character string included in the comparison file corresponding to the at least one source code with a character string included in the source code, and providing at least one of information indicating whether the source code has been patched, identified based on a result of the comparison, a probability that the source code has been patched, or information about a vulnerability in the source code through an output device of the electronic device.

According to various embodiments, an electronic device includes a communication circuit, a memory storing at least one source code, and a processor operatively coupled to the memory and the communication circuit. The processor is configured to receive a patch file corresponding to at least a part of the at least one source code through the communication circuit, identify file identification information that identifies a source code to which the patch file is applied, classify each of at least one character string into a correction or a vulnerability, generate a comparison file to be compared with the source code, which includes at least one of the file identification information, the correction, or the vulnerability, and store the comparison file in the memory.

According to various embodiments, an electronic device that provides information indicating whether software included in an application contains a vulnerability, information indicating whether the software has been patched, and information about vulnerabilities in the software by comparing a comparison file of vulnerabilities or corrections obtained from a collected patch file with the source code of the application, and a method of operating the electronic device may be provided.

An electronic device according to various embodiments provides information indicating whether an open source of an application contains any vulnerability. Therefore, an application developer does not need to manually identify whether each open source of the application has been patched.

BRIEF DESCRIPTION OF THE DRAWINGS

FIG. 10b is a diagram illustrating a patch file, a comparison file, and a target inspection file according to various embodiments.

FIG. 10d is a diagram illustrating a patch file, a comparison file, and a target inspection file according to various embodiments.

DETAILED DESCRIPTION

Figure 1:
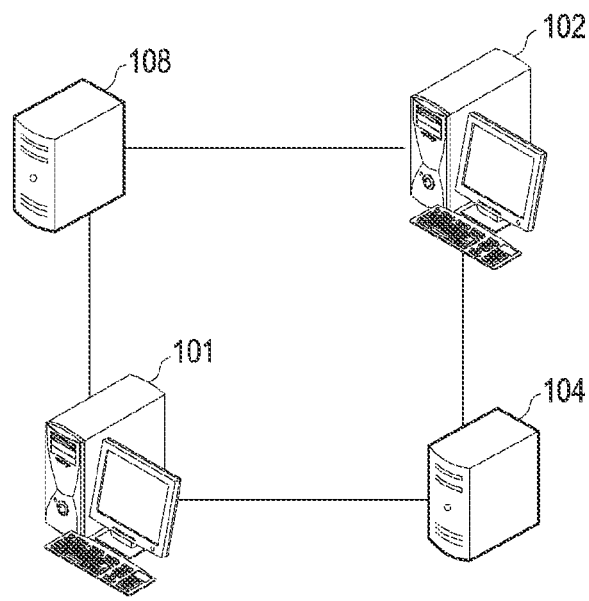
FIG. 1 is a diagram illustrating a system including electronic devices and servers according to various embodiments.

An electronic device according to various embodiments of the disclosure may be one of various types of electronic devices. Various embodiments of the disclosure and terms used herein are not intended to limit the technical scope of the disclosure, and it is to be understood that the present disclosure covers various modifications, equivalents, and/or alternatives. With regard to the description of the drawings, similar reference numerals may be used to refer to similar elements. It is to be understood that singular forms include plural referents unless the context clearly dictates otherwise. In the disclosure, the term "A or B", "at least one of A and/or B", "A, B or C", or "at least one of A, B and/or C" may cover all possible combinations of enumerated items. The term as used in the disclosure, "$1^{st}$", "$2^{nd}$", "first" or "second' may be used for the names of various components irrespective of sequence or importance, not limiting the components. These expressions are used to distinguish one component from another component. When it is said that a component (e.g., a first component) is "operatively or communicatively coupled with/to" or "connected to" another component (e.g., a second component), it should be understood that the one component is connected to the other component directly or through any other component (e.g., a third component).

As used herein, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, the module may be implemented as an application-specific integrated circuit (ASIC).

FIG. 1 is a diagram illustrating a system including electronic devices and servers according to various embodiments.

As illustrated in FIG. 1, an electronic device 101 may communicate with a server 108 (for example, a repository), and an external electronic device 102 may communicate with the server 108. The electronic device 101 is, for example, an electronic device used by an application developer and may receive at least one source code (for example, open source) for application creation from the server 108 that opens the source code. The server 108 is a source code repository that receives, manages, and opens various sources such as open sources. For example, the server 108 may be any of, but not limited to, various source code repositories such as sourchforge, rubyforge, tigris, and bountysource. The electronic device 101 may execute a Web browsing application according to a user's manipulation through an input device, and directly receive a uniform resource identifier (URI) for accessing an open source server, or a choice of an object corresponding to the URI. The electronic device 101 may access a Web page corresponding to the URI (for example, a Web page for open source downloading) and download an open source. As far as it is capable of downloading an open source from the server 108, any device may be the electronic device 101, and the electronic device 101 may be implemented as any of various types such as a personal computer (PC), a tablet PC, and a smartphone.

The electronic device 101 may download at least one patch file corresponding to the open source from the server 108. The electronic device 101 may check information about vulnerabilities from a server 104 that provides information about vulnerabilities in open sources. For example, the server 104 corresponding to a common vulnerabilities and exposures (CVE) system may provide a reference (for example, serial number) and related content for information-security vulnerabilities and exposures. For example, identification information about a vulnerability (for example, the serial number of the vulnerability) may be configured in the format of "CVE-year-serial number", and "CVE-2015-8000" may mean the 8000 reported vulnerability in 2015. The server 104 corresponding to the CVE system may provide a CVE specification, for example, a CVE specification corresponding to an externally designated serial number. The CVE specification may include a description of vulnerabilities. The CVE is merely exemplary, and it will be easily understood by those skilled in the art that any mechanism may be used as far as it enables vulnerability identification. An open source developer or a third party may discover a vulnerability in an open source, and transmit information about the vulnerability to the server 104 corresponding to the CVE system through an electronic device. The server 104 which provide information about vulnerabilities may provide the received vulnerability information. The open source developer or the third party may identify the information about the vulnerability and create a patch file to correct the vulnerability. For example, the open source developer or the third party may generate a patch file using the external electronic device 102, and the external electronic device 102 may transmit the patch file to the server 108.

The electronic device 101 may receive a patch file corresponding to the identified vulnerability from the server 108. The electronic device 101 may identify information about open source vulnerabilities from the server 104 corresponding to the CVE system. The electronic device 101 may receive a patch file for correcting the open source vulnerabilities by accessing the server 108 that provides open sources or another electronic device based on the information about the identified open source vulnerabilities. The electronic device 101 may periodically or aperiodically receive information about vulnerabilities of various open sources from the server 104 corresponding to the CVE system. The electronic device 101 may automatically access the server 108 based on information received from the server 104 corresponding to the CVE system to download a related patch file, or may access the server 108 by a user's manipulation to download a related patch file. The electronic device 101 may access not only the server 108 but also a server (not shown) corresponding to another source in order to download the patch file. That is, the electronic device 101 may collect various patch files corresponding to various open sources. The electronic device 101 may collect patch files through various Web crawling (or spidering) schemes based on information about identified vulnerabilities. There is no limit on crawlers that may crawl patch files. In various embodiments, the electronic device 101 may give priority to crawling to first collect patch files with relatively weak security. The electronic device 101 may collect patch files without using information received from the CVE. The electronic device 101 may collect patch files by performing Web crawling using various pieces of information other than the information received from the CVE as a seed.

In various embodiments, the electronic device 101 may filter a patch file that satisfies a specified condition among the collected patch files. For example, the electronic device 101 may store a more valid patch file by filtering a patch file having a specific extension (or identification information) (for example, ".md", ".bb", or nix) among the patch files. That is, the electronic device 101 may be configured to generate a comparison file only for the patch file obtained as a result of filtering.

While the server 108 is shown as storing both an open source and a patch file in the embodiment of FIG. 1, this is merely exemplary, and the open source and the patch file may be stored in different storing locations (or different repositories).

The electronic device 101 may generate a comparison file from a collected patch file. The electronic device 101 may compare the generated comparison file with the source code included in the application. Based on the result of the comparison, the electronic device 101 may provide various pieces of information such as information indicating whether the source code is a patched version, information indicating whether the source code needs to be patched, a probability that the source code has been patched, information indicating whether there is any character string to be corrected in the source code, and information about the position of a character string to be corrected in the source code. The process of generating a comparison file and the comparison process at the electronic device 101 will be described in greater detail later. Once the electronic device 101 identifies that a patch file needs to be applied according to the result of the comparison, the electronic device 101 may automatically correct at least one character string in the source code.

Figure 2:
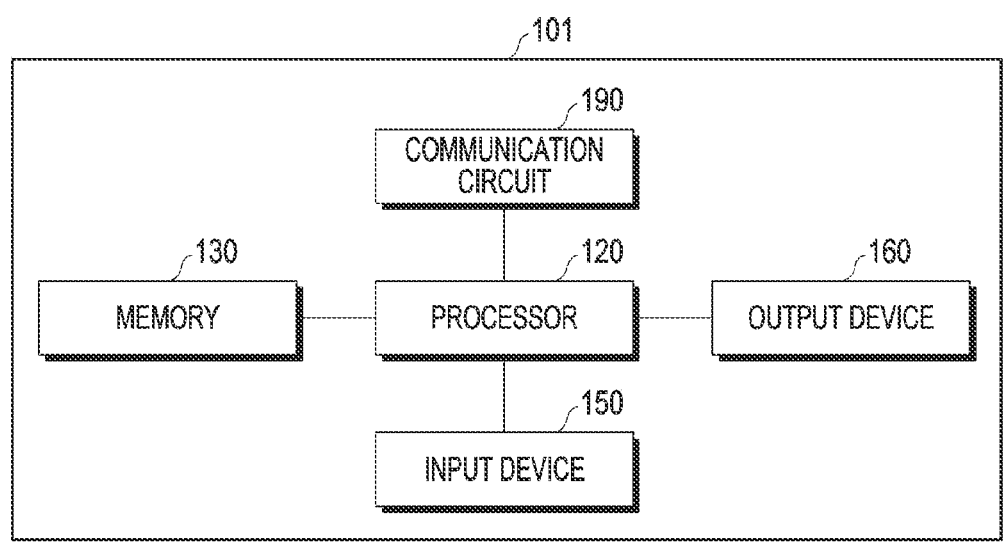
FIG. 2 is a block diagram illustrating an electronic device according to various embodiments.

FIG. 2 is a block diagram illustrating an electronic device according to various embodiments.

According to various embodiments, the electronic device 101 may include a processor 120, a memory 130, an input device 150, an output device 160, and a communication circuit 190.

The processor 120 may control at least one other component (for example, hardware or software component) of the electronic device 101, which is coupled to the processor 120, for example, by executing software (for example, a program), and perform processing of various data or computations. According to an embodiment, as at least a part of the data processing or computations, the processor 120 may load a command or data received from another component (for example, the memory 130, the input device 150, or the communication circuit 190) to a volatile memory, process the command or data stored in the volatile memory, and store the resulting data in a non-volatile memory. According to an embodiment, the processor 120 may include a main processor (for example, a central processing unit (CPU) or an application processor) and an auxiliary processor (for example, a graphics processing unit, an image signal processor, a sensor hub processor, or a communication processor) which operates independently of or in conjunction with the main processor. Additionally or alternatively, the auxiliary processor may be configured to use lower power than the main processor or to be specialized for a designated function. The auxiliary processor may be implemented separately from or as a part of the main processor.

The memory 130 may store various types of data used by at least one component of the electronic device 101 (for example, the processor 120). The data may include, for example, software (for example, a program) and input data or output data for commands related to the software. The memory 130 may include a volatile memory or a nonvolatile memory. According to various embodiments, the memory 130 may store at least one of a source code, a comparison file used to verify the source code, or a patch file. The memory 130 may store various instructions such as an instruction for loading, editing, and providing a source code (program or application), an instruction for comparison to verify the source code, an instruction for loading a patch file, and an instruction for generating a comparison file from the patch file.

The input device 150 may receive a user input, convert the user input into an electrical signal, and transmit the electrical signal to the processor 120. The input device 150 may be implemented as, for example, a keyboard, a mouse, or an electronic pen. However, as far as it is capable of receiving external information from, for example, a microphone, a touch panel, and a camera, any device may be used as the input device 150. Further, the input device 150 may be located outside a housing of the electronic device 101. Depending on implementation, the input device 150 may not be included in the electronic device 101. The input device 150 may receive instructions for performing various operations of the electronic device 101.

The output device 160 may provide information visually, audibly, or tactually to the outside of the electronic device 101 (for example, the user). The output device 160 may include, for example, a liquid crystal display (LCD) panel, a hologram device, or a projector, and a control circuit for controlling the device. According to an embodiment, the output device 160 may include touch circuitry configured to sense a touch, or sensor circuitry (for example, a pressure sensor) configured to measure the strength of a force generated by the touch. The output device 160 may also be located outside the housing of the electronic device 101. Depending on implementation, the output device 160 may not be included in the electronic device 101.

The communication circuit 190 may support establishment of a direct (for example, wired) communication channel or a wireless communication channel between the electronic device 101 and an external electronic device, and communication through the established communication channel. The communication circuit 190 may include one or more communication processors operating independently of the processor 120 (for example, an application processor) and supporting direct (for example, wired) communication or wireless communication. According to an embodiment, the communication circuit 190 may include a wireless communication module (for example, a cellular communication module, a short-range wireless communication module, or a global navigation satellite system (GNSS) communication module) or a wired communication module (for example, a local area network (LAN) communication module or a power line communication module). Among these communication modules, a corresponding communication module may communicate with an external electronic device through a first network (for example, a short-range communication network such as Bluetooth, wireless fidelity (WiFi) direct, or infrared data association (IrDA)) or a second network (for example, a cellular network, the Internet, or a computer network (for example, a long-distance communication network such as LAN or wireless LAN (WLAN)). These various types of communication modules may be integrated into one component (for example, a single chip), or may be implemented as a plurality of separate components (for example, multiple chips). The wireless communication module may identify and authenticate the electronic device 101 in a communication network such as the first network or the second network, using subscriber information (for example, an international mobile subscriber identifier (IMSI)) stored in a subscriber identification module (SIM).

According to various embodiments, the memory 130 may store at least one source code and a comparison file including any one of a correction and a vulnerability as which each of at least one character string included in a patch file corresponding to the at least one source code is classified. The processor 120 may be functionally coupled to the memory 130 and the display device 160.

According to various embodiments, the processor 120 may be configured to load the at least one source code stored in the memory 130, compare a character string included in the at least one source code with a character string included in the comparison file corresponding to the at least one source code, and provide at least one of information indicating whether the source code has been patched, a probability that the source code has been patched, or information about a vulnerability in the at least one source code to the output device.

According to various embodiments, the processor 120 may be configured to identify a first match rate which is a ratio of the number of first character strings included in the source code to the total number of first character strings included in the vulnerability of the comparison file, and a second match rate which is a ratio of the number of second character strings included in the source code to the total number of second character strings included in the correction of the comparison file, as at least a part of the operation of comparing character strings included in the at least one source code with character strings included in the comparison file corresponding to the at least one source code.

According to various embodiments, when identifying that the first match rate is greater than a first threshold, the processor 120 may be configured to identify that the source code has not been patched, as at least a part of the operation of comparing character strings included in the at least one source code with character strings included in the comparison file corresponding to the at least one source code.

According to various embodiments, the processor 120 may provide the first match rate as the probability that the source code has not been patched, as at least a part of the operation of providing at least one of information indicating whether the source code has been patched, the probability that the source code has been patched, or information about a vulnerability in the at least one source code through the output device 160 based on the comparison result.

According to various embodiments, when identifying that the second match rate is greater than a second threshold, the processor 120 may be configured to identify that the source code has been patched, as at least a part of the operation of comparing character strings included in the at least one source code with character strings included in the comparison file corresponding to the at least one source code.

According to various embodiments, the processor 120 may be configured to provide the second match rate as the probability that the source code has been patched, as at least a part of the operation of providing at least one of information indicating whether the source code has been patched, the probability that the source code has been patched, or information about a vulnerability in the at least one source code through the output device 160 based on the comparison result.

According to various embodiments, the processor 120 may be configured to identify at least one partial character string identical at least partially to at least one first character string included in the vulnerability of the comparison file, among the character strings included in the source code, as at least a part of the operation of comparing character strings included in the at least one source code with character strings included in the comparison file corresponding to the at least one source code.

According to various embodiments, the processor 120 may be configured to provide information about the position of the identified partial character string, as at least a part of the operation of providing at least one of information indicating whether the source code has been patched, the probability that the source code has been patched, or information about a vulnerability in the at least one source code through the output device 160 based on the comparison result.

According to various embodiments, the processor 120 may be configured to identify at least one partial character string identical at least partially to at least one first character string included in the vulnerability of the comparison file, among the character strings included in the comparison file corresponding to the at least one source code, as at least a part of the operation of comparing character strings included in the at least one source code with character strings included in the comparison file corresponding to the at least one source code.

According to various embodiments, the processor 120 may be configured to display the source code in a manner that distinguishes the identified partial character string from the other character strings, as at least a part of the operation of providing at least one of information indicating whether the source code has been patched, the probability that the source code has been patched, or information about a vulnerability in the at least one source code through the output device 160 based on the comparison result.

According to various embodiments, the processor 120 may further be configured to check file identification information about the source code and identify the comparison file having file identification information matching the file identification information about the source code.

According to various embodiments, the processor may be configured to receive a patch file corresponding to at least a part of the at least one source code through the communication circuit 190, check the file identification information that identifies the source code to which the patch file is applied, classify each of at least one character string included in the patch file as a correction or a vulnerability, generate a comparison file to be compared with the source code, which includes at least one of the file identification information, the correction, or the vulnerability, and store the comparison file in the memory 130.

According to various embodiments, the processor 120 may be configured to identify a common character string which is the same character string included commonly in the correction and the vulnerability, generate an adjusted correction by excluding the common character string from the character strings of the correction, generate an adjusted vulnerability by excluding the common character string from the character strings of the vulnerability, and generate a comparison file including at least one of the file identification information, the adjusted correction, or the adjusted vulnerability, as at least a part of the operation of generating the comparison file to be compared with the source code, which includes at least one of the file identification information, the correction, or the vulnerability.

According to various embodiments, the processor 120 may further be configured to collect a plurality of patch files through the communication circuit 190 and generate a comparison file for a patch file with information and an extension, at least one of which satisfies a predetermined condition.

According to various embodiments, the processor 120 may be configured to exclude a first prefix indicating deletion from at least one character string included in the vulnerability, exclude a second prefix indicating correction from at least one character string included in the correction, and generate a comparison file including at least one of an adjusted vulnerability without the first prefix or an adjusted correction without the second prefix, as at least a part of the operation of generating the comparison file to be compared with the source code, which includes at least one of the file identification information, the correction, or the vulnerability.

Figure 3:
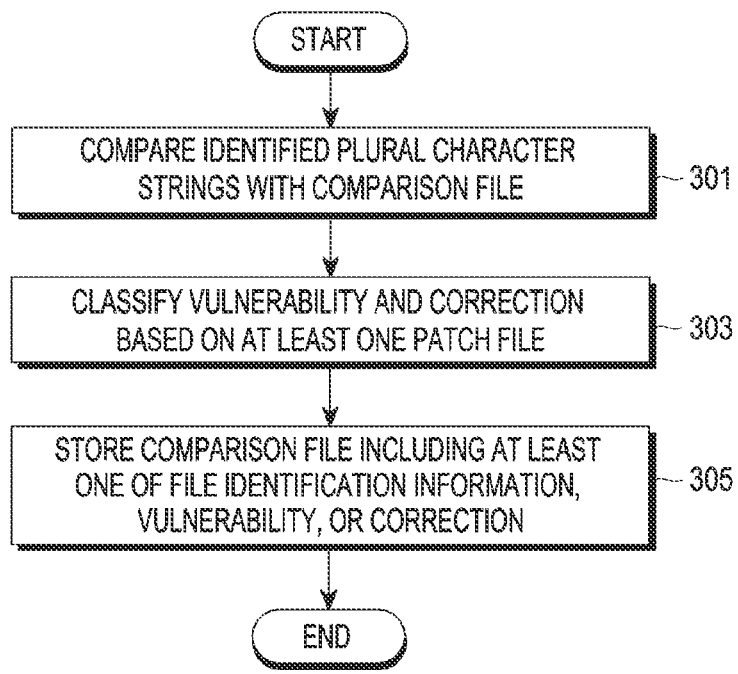
FIG. 3 is a flowchart illustrating a method of operating an electronic device according to various embodiments.
Figure 4:
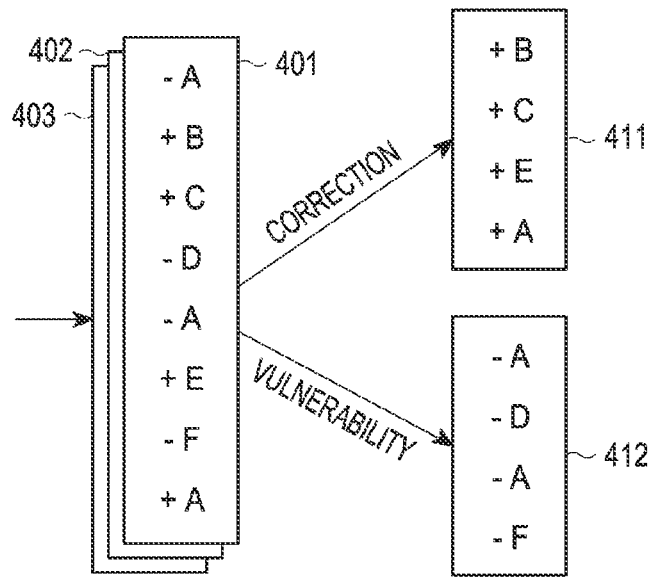
FIG. 4 is a diagram illustrating a process of generating a comparison file according to various embodiments.

FIG. 3 is a flowchart illustrating a method of operating an electronic device according to various embodiments. The embodiment of FIG. 3 will be described in greater detail with reference to FIG. 4. FIG. 4 is a diagram illustrating a process of generating a comparison file according to various embodiments.

According to various embodiments, the electronic device 101 may receive at least one patch file corresponding to at least one file in operation 301. As described before, the electronic device 101 may access the server 108 corresponding to the CVE automatically based on information received from the server 104 or according to a user's manipulation, to download a related patch file. Alternatively, the electronic device 101 may randomly download a patch file. The electronic device 101 may access a server (not shown) corresponding to another source as well as the server 108 to download a patch file. For example, the electronic device 101 may collect a patch file by various Web crawling schemes based on information about an identified vulnerability. The electronic device 101 may identify vulnerability information corresponding to a stored source code and collect a patch file corresponding to the stored source code based on the identified vulnerability information. According to various embodiments, the electronic device 101 may collect other patch files in addition to the patch file corresponding to the stored source code.

Referring to FIG. 4, for example, the electronic device 101 may receive patch files 401, 402, and 403. The first patch file 401 may include a plurality of character strings −A, +B, +C, −D, −A, +E, −F, and +A. For the convenience of description, while each of the plurality of character strings −A, +B, +C, −D, −A, +E, −F, and −A is denoted by a single English capital letter, the single English capital letter may represent a character string (for example, −for (rc=ldap_get_attribute_ber(li→ld, ent, ber, &bv, bvp);) in a source code. "−" included in the patch files is a prefix implying that the following character string is to be deleted from the source code, and "+" included in the patch files is a prefix implying that the following character string is to be added to the source code.

In the disclosure, when it is said that the electronic device 101 performs a specific process, this may mean that the processor 120 included in the electronic device 101 performs the specific process or controls other hardware to perform the specific process. Alternatively, when it is said that the electronic device 101 performs a specific process, this may mean that specific hardware performs the specific process without control of the processor 120. Alternatively, when it is said that the electronic device 101 performs a specific process, for example, this may mean that as at least one command stored in the memory 130 included in the electronic device 101 is executed, the processor 120 performs the specific process or controls other hardware to perform the specific process.

In operation 303, the electronic device 101 may classify a vulnerability and a correction based on the at least one patch file. The electronic device 101 may tokenize the first patch file 401. For example, the electronic device 101 may perform lexical analysis using a compiler or an assembler. The electronic device 101 may identify the plurality of character strings −A, +B, +C, −D, −A, +E, −F, and +A, respectively from the first patch file 401 as a result of the lexical analysis. The present disclosure is not limited to any particular lexical analysis tool. The electronic device 101 may classify the identified character strings −A, +B, +C, −D, −A, +E, −F, and +A into a correction 411 and a vulnerability 412, respectively. For example, the electronic device 101 may classify character strings with the prefix of "+" (for example, +B, +C, +E, and +A) into the correction 411, and character strings with the prefix of "−" (for example, −A, −D, −A, and −F) into the vulnerability 412.

In operation 305, the electronic device 101 may store a comparison file including at least one of file identification information, the vulnerability, or the correction. The file identification information may be information that identifies file to be supplemented with the patch file, and may be information such as a file path of the patch file or the file name of a target to be patched. The file identification information may be used later to identify whether a corresponding source is an inspection target, which will be described in greater detail later. According to various embodiments, the electronic device 101 may store the file identification information in association with the vulnerability, the correction, or both. For example, the electronic device 101 may store a comparison file as described in Table 1.

TABLE 1

| file identification information | corrections | vulnerabilities |
|---|---|---|
| Code #1 | + for(rc = ldap_get_attribute_ber(li->ld, ent, ber, &bv, &bvals); + (rc == LDAP_SUCCESS) && bvals; + rc = ldap_get_attribute_ber(li->ld, ent, ber, &bv, &bvals)) { | − for(rc = ldap_get_attribute_ber(li->ld, ent, ber, &bv, bvp); − rc == LDAP_SUCCESS; − rc = ldap_get_attribute_ber(li->ld, ent, ber, &bv, bvp)) { |
| Code #2 | + if (f == NULL + ‖ f->addressFamily == NULL + ‖ f->addressFamily->data == NULL + ‖ f->addressFamily->length < 2) + return 0; + return (f->addressFamily->data[0] << 8) ‖ f->addressFamily->data[1]; | − return ((f != NULL && − f->addressFamily != NULL && f->addressFamily->data != NULL) − ? ((f->addressFamily->data[0] << 8) ‖ (f->addressFamily->data[1])) − : 0); |
| Code #3 | + size_t alloc; ... + size_t newlen; ... + if(inlength < 0) + return NULL; + + alloc = (inlength?(size_t)inlength:strlen(string)+1; + newlen = alloc; | − size_t alloc = (inlength?(size_t)inlength:strlen(string))+1; ... − size_t newlen = alloc; |

As illustrated in Table 1, the electronic device 101 may store corrections and vulnerabilities with respect to file identification information. "Code #1", "Code #2" and "Code #3" in Table 1 may be identification information that identifies source codes, files, or software, and may be, but not limited to, file paths or file names. The file identification information may be identified from a first patch file, a second patch file, and a third patch file, respectively. As described before, only corrections or only vulnerabilities may be stored by mapping them to the file identification information. In various embodiments, the electronic device 101 may store the corrections without "+" from their character strings, and the vulnerabilities without "−" from their character strings. For example, after classifying corrections and vulnerabilities, the electronic device 101 may delete the prefixes (for example, "+" and "−") from the classified character strings and store the character strings without "+" (for example, for(rc=ldap_get_attribute_ber(li->ld, ent, ber, &bv, &bvals);) as corrections and the character strings without "−" (for example, for(rc=ldap_get_attribute_ber (li→ld, ent, ber, &bv, bvp);) as vulnerabilities.

In various embodiments, the electronic device 101 may also manage the sequence of a plurality of character strings included in one vulnerability. For example, the electronic device 101 may store information indicating that in the correction of the source code of "Code #1", "+ for (rc=ldap_get_attribute_ber(li→ld, ent, ber, &bv, &bvals);" is the first additional string, "+(rc==LDAP_SUCCESS) && bvals;" is the second additional string, and "+rc=ldap_get_attribute_ber(li→ld, ent, ber, &bv, &bvals)) {" is the third additional string. The sequence of the character strings may be determined according to the order of arrangement in the patch file. For example, the first additional string "+ for(rc=ldap_get_attribute_ber(li→ld, ent, ber, &bv, &bvals);" may be positioned in a line preceding the second additional string "+(rc==LDAP_SUCCESS).) && bvals;" in the first patch file. The electronic device 101 may assign a higher priority to a character string located in a higher line in the patch file. When the character strings are managed in order, the electronic device 101 may compare a source code to be inspected with a comparison file in consideration of the arrangement order of character strings in the source code to be inspected during comparison, which will be described in greater detail later.

On the contrary, the electronic device 101 according to various embodiments may store the character strings with no regard to the order of arrangement of the character strings in the vulnerability or correction.

Figure 5:
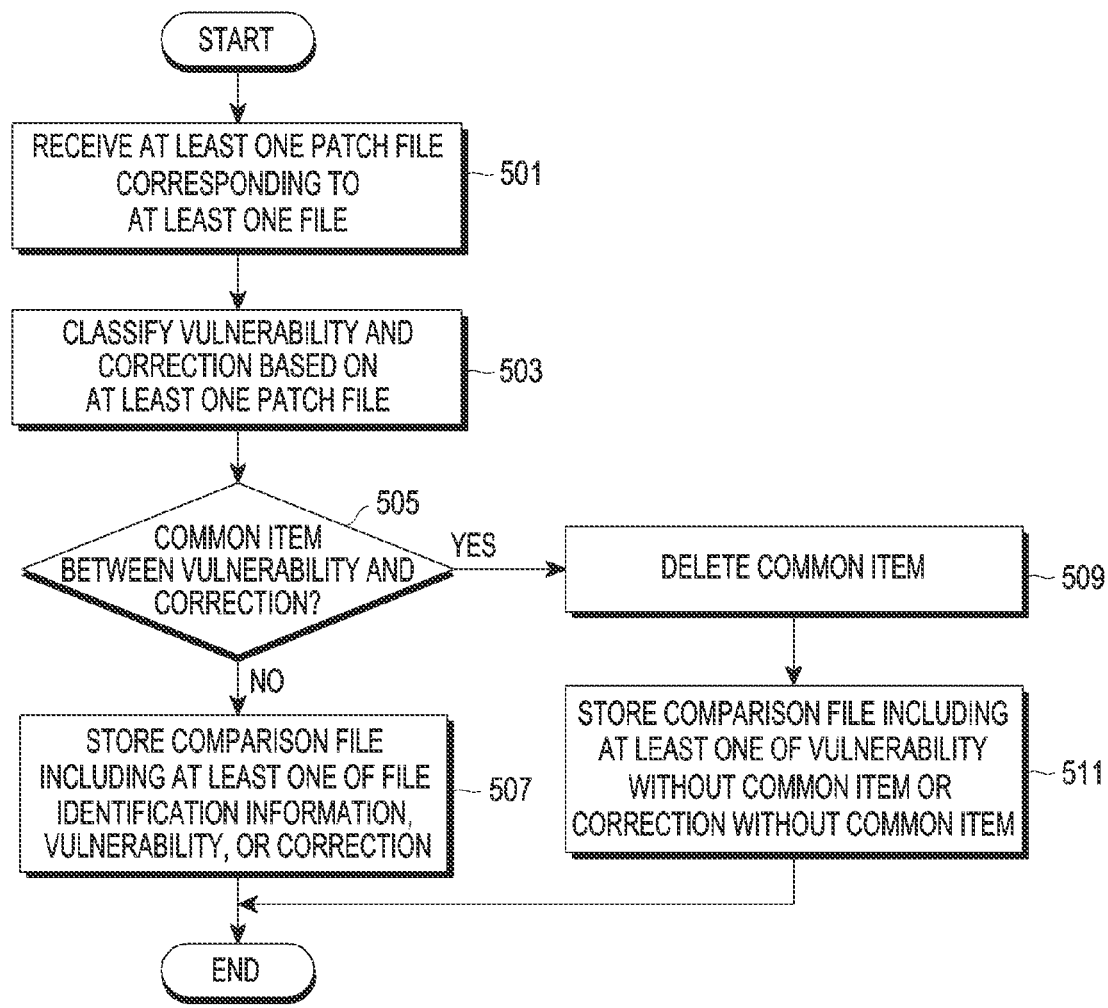
FIG. 5 is a flowchart illustrating a method of operating an electronic device according to various embodiments.
Figure 6:
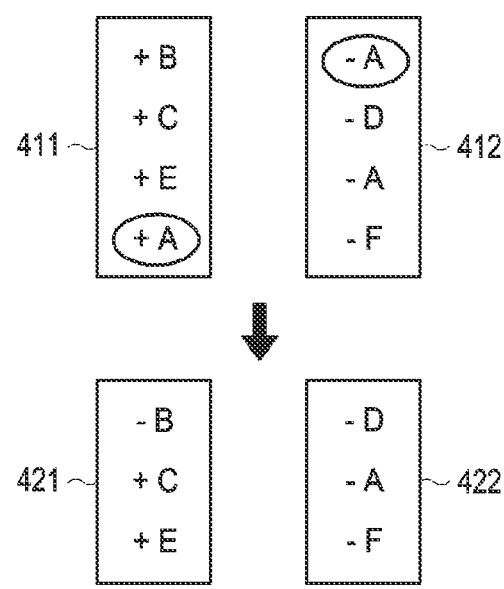
FIG. 6 is a diagram illustrating adjustment of a vulnerability and a correction according to various embodiments.

FIG. 5 is a flowchart illustrating a method of operating an electronic device according to various embodiments. The embodiment of FIG. 5 will be described in greater detail with reference to FIG. 6. FIG. 6 is a diagram illustrating adjustment of a vulnerability and a correction according to various embodiments.

According to various embodiments, the electronic device 101 may receive at least one patch file corresponding to at least one file in operation 501. In operation 503, the electronic device 101 may classify a vulnerability and a correction based on the at least one patch file. The process of receiving a patch file and the process of classifying a vulnerability and a correction have been described before in detail, and thus will not be described in detail herein.

In operation 505, the electronic device 101 may identify whether there is a common item between the vulnerability and the correction. For example, as illustrated in FIG. 6, the electronic device 101 may identify the correction 411 and the vulnerability 412 according to the classification result of operation 503. The electronic device 101 may identify that the character string +A in the correction 411 and the character string −A in the vulnerability 412 have the same content, differing only in the prefixes. In the case where the electronic device 101 has stored the character strings after deleting the prefixes "+" and "−", the electronic device 101 may also identify that the character string A in the correction 411 is identical to the character string A in the vulnerability in 412.

When determining that there are no common items between the vulnerability and the correction, the electronic device 101 may store a comparison file including at least one of file identification information, the vulnerability, or the correction in operation 507. For example, when there are no character strings that have the same content, differing only in the prefixes in the vulnerability and the correction, the electronic device 101 may store a comparison file including at least one of the identified correction or vulnerability. Alternatively, in the absence of the same character string in the vulnerability and the correction, the electronic device 101 may store a comparison file including at least one of the identified correction or vulnerability.

When determining that there is a common item between the vulnerability and the correction, the electronic device 101 may delete the common item in operation 509. For example, as illustrated in FIG. 6, when the character string "+A" and the character string "−A" have the same content, differing only in the prefixes, the electronic device 101 may generate an adjusted correction 421 and an adjusted vulnerability 422 by deleting the common character strings "+A" and "−A". Alternatively, when the prefixes have already been deleted, the electronic device 101 may generate the adjusted correction and the adjusted vulnerability by deleting the character string A commonly included in the correction and the vulnerability. While only the first "−A" of the two "−A"s present in the vulnerability 412 is shown in FIG. 6 as deleted, this is exemplary, and both "−A"s may be deleted. In operation 511, the electronic device 101 may store a comparison file including at least one of the vulnerability or correction, from which the common item has been deleted.

In various embodiments, the electronic device 101 may generate the comparison file by deleting a common item between the vulnerability and the correction or without deleting the common item.

In various embodiments, when the length of a character string included in the vulnerability and the correction satisfies a predetermined condition, the electronic device 101 may delete the character string from at least one of the vulnerability or correction. For example, when the length of the character string is less than a threshold, the electronic device 101 may delete the character string from at least one of the vulnerability or the correction. Alternatively, when predetermined test (for example, "return") is included in a character string, the electronic device 101 may delete the character string from at least one of the vulnerability or the correction.

Figure 7A:
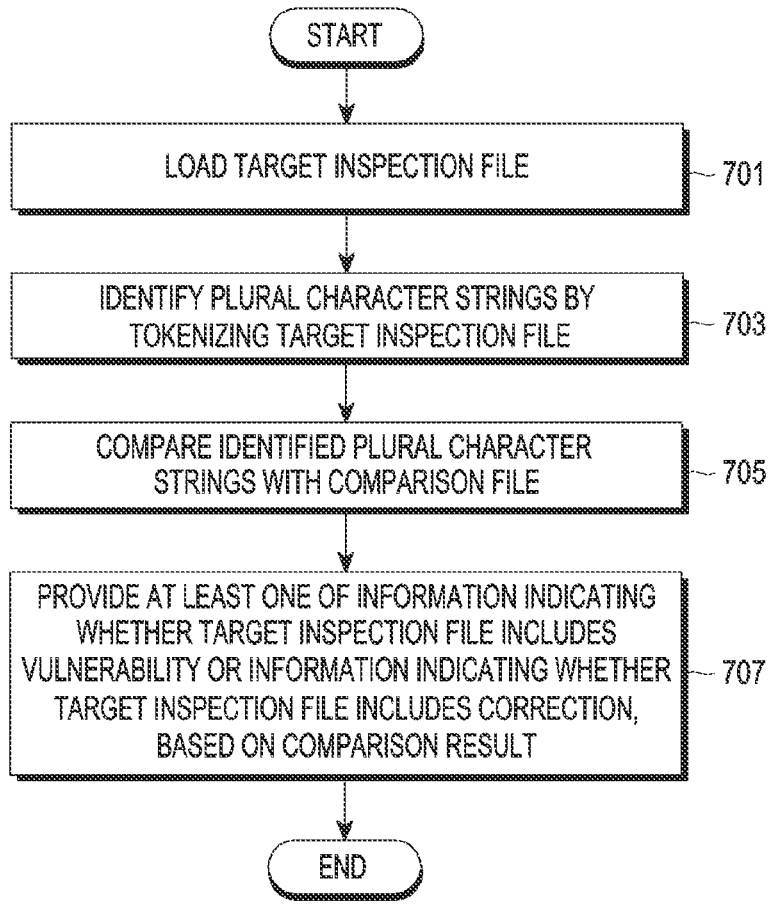
FIG. 7a is a flowchart illustrating a method of operating an electronic device according to various embodiments.
Figure 8:
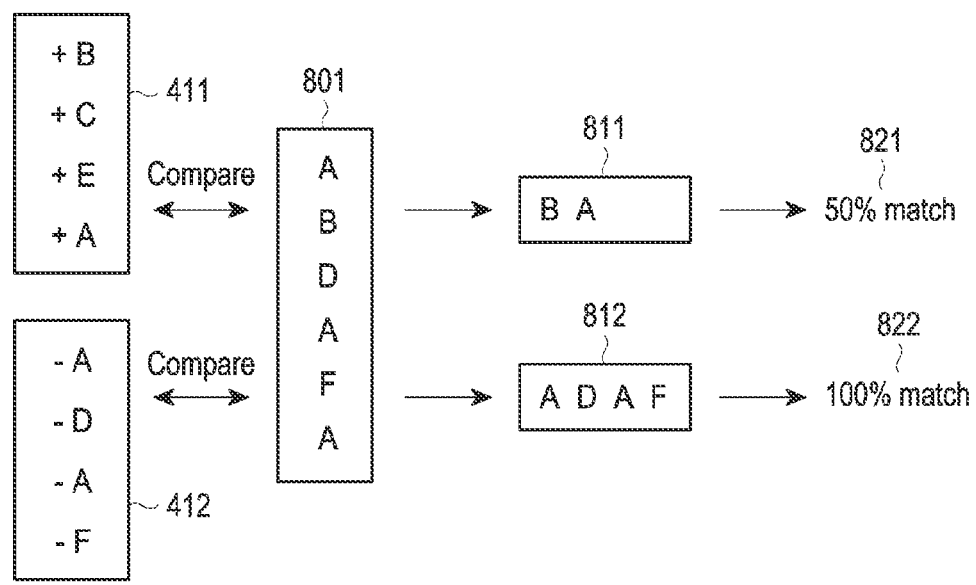
FIG. 8 is a diagram illustrating a process of comparing a comparison file with a source code according to various embodiments.

FIG. 7a is a flowchart illustrating a method of operating an electronic device according to various embodiments. The embodiment of FIG. 7a will be described in greater detail with reference to FIG. 8. FIG. 8 is a diagram illustrating a process of comparing a comparison file with a source code according to various embodiments.

According to various embodiments, the electronic device 101 may load a target file to be inspected, that is, a target inspection file in operation 701. For example, the electronic device 101 may load an application under development (or a completed application) as a target inspection file. The target inspection file may refer to an application (or program) or a source code included in the application.

In operation 703, the electronic device 101 may tokenize the target inspection file to identify a plurality of character strings. For example, as illustrated in FIG. 8, the electronic device 101 may tokenize a target inspection file 801 to identify a plurality of character strings A, B, D, A, F, and A. As described above, while the character strings are shown as English capital letters A, B, D, A, F, and A for simplification, each English capital letter may represent, for example, a character string (for example, for(rc=ldap_get_attribute_ber (li→ld, ent, ber, &bv, bvp);) included in a source code, as listed in Table 1.

In operation 705, the electronic device 101 may compare the identified plurality of character strings with a comparison file. For example, as illustrated in FIG. 8, the electronic device 101 may compare each character string of the target inspection file 801 with at least one of the correction 411 or the vulnerability 412 included in the comparison file. As illustrated in FIG. 8, when the prefixes "+" and "−" have been reflected in the correction 411 and the vulnerability 412, the electronic device 101 may exclude the prefixes from the character strings in at least one of the correction 411 or the vulnerability 412 and then identify whether the character strings of the target inspection file 801 are identical to the character strings. For example, as illustrated in FIG. 8, the electronic device 101 may obtain a first comparison result 811 indicating that the character strings "B" and "A" among the four character strings of the correction 411 in the comparison file are identical to "B" and the second "A" in the target inspection file 801. Although the first character string of the target inspection file 801 is "A" and the fourth character string of the corrections 411 is "+A", the electronic device 101 may determine that the first "A" of the target inspection file 801 does not match the fourth character string "+A" of the correction 411 by performing the comparison in consideration of the sequence of the character strings in the correction 411 and the sequence of the character strings in the target inspection file 801. For example, the electronic device 101 may identify a match rate according to the result of calculating a longest common sequence (LCS) between the character strings of the correction 411 and the character strings of the target inspection file 801. The electronic device 101 may identify a first match rate 821, 50% based on the first comparison result 811 indicating that two of the four character strings of the correction 411 are identical to character strings in the target inspection file 801.

The electronic device 101 may compare the character strings of the target inspection file 801 with the character string of the vulnerability 412. The electronic device 101 may identify a second comparison result 812 indicating that the first "A", "D", the second "A", and "F" among the character strings of the target inspection file 801 are identical to character strings in the vulnerability 412. Further, the electronic device 101 may identify a second match rate 822, 100% indicating that all of the four character strings of the vulnerability 412 are identical to character strings in the target inspection file 801 based on the second comparison result 812.

In operation 707, the electronic device 101 may provide at least one of information indicating whether the target inspection file includes a vulnerability or information indicating whether the target inspection file includes a correction based on the comparison results. For example, the electronic device 101 may provide information indicating whether the inspection target includes a correction, that is, whether the inspection target is a patched version, based on whether the first match rate 821 exceeds a threshold. For example, the electronic device 101 may provide information indicating whether the inspection target includes any vulnerability, that is, whether the target inspection file is a version prior to patch, based on whether the second match rate 822 exceeds a threshold. The threshold compared with the match rate of the correction may be set to be equal to or different from the threshold compared with the match rate of the vulnerability. Alternatively, the threshold may be set according to the number of character strings included in the correction or vulnerability.

In various embodiments, the electronic device 101 may manage the character strings of the correction 411 or the character strings of the vulnerability 412 regardless of their sequences, as described before. The electronic device 101 may identify whether the character strings of the comparison file matches the character strings of the target inspection file 801 without considering the arrangement order of the character strings.

Figure 7B:
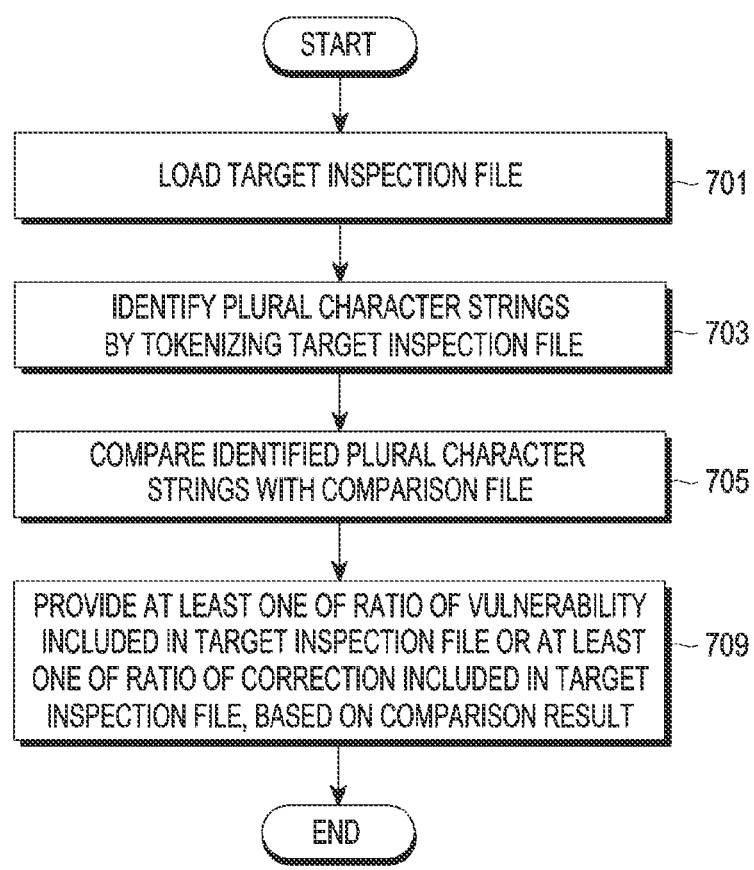
FIG. 7b is a flowchart illustrating a method of operating an electronic device according to various embodiments.
Figure 7C:
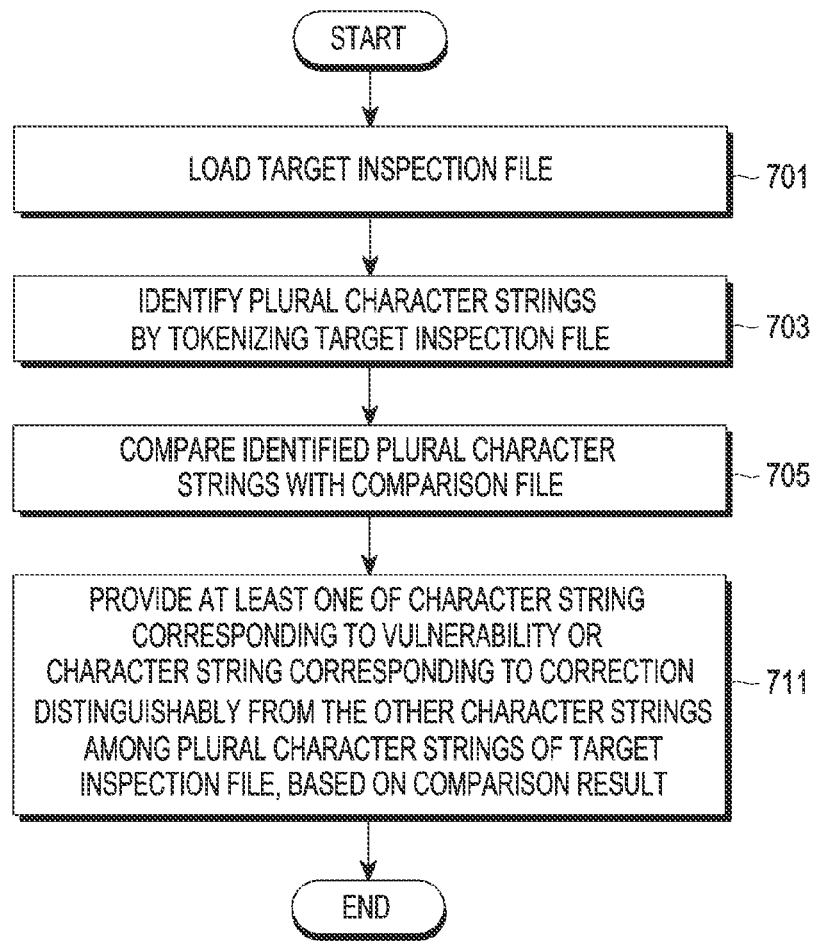
FIG. 7c is a flowchart illustrating a method of operating an electronic device according to various embodiments.
Figure 7D:
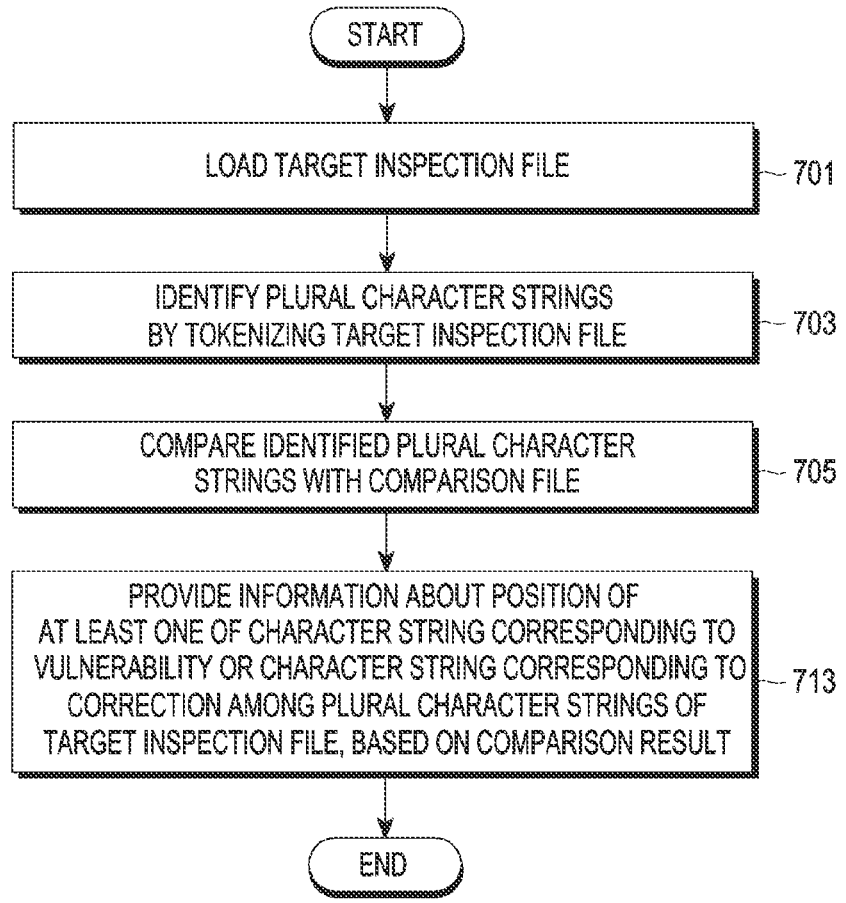
FIG. 7d is a flowchart illustrating a method of operating an electronic device according to various embodiments.

FIGS. 7b, 7c and 7d are flowcharts illustrating a method of operating an electronic device according to various embodiments. Operations 701 to 705 of FIGS. 7b, 7c and 7d have been described before with reference to FIG. 7a, and thus will not be described herein. In the embodiment of FIG. 7b, the electronic device 101 may provide at least one of a proportion of the vulnerability or a proportion of the correction in the target inspection file based on the comparison results in operation 709. For example, the electronic device 101 may provide at least one of the first match rate 821 or the second match rate 822 in FIG. 8.

In the embodiment of FIG. 7c, the electronic device 101 may display at least one of a character string corresponding to the vulnerability or a character string corresponding to the correction, distinguishably from the other character strings, among the plurality of character strings of the target inspection file based on the comparison results in operation 711. For example, the electronic device 101 may differentiate various attributes such as the color, size, and surrounding color of the character string corresponding to the correction or the vulnerability from those of the other character strings in the entire source code.

In the embodiment of FIG. 7d, the electronic device 101 may provide information about the position of the at least one of the character string corresponding to the vulnerability or the character string corresponding to the correction among the plurality of character strings in the target inspection file based on the comparison results in operation 713. For example, the electronic device 101 may provide the position information such as the number of a line in which the character string corresponding to the correction or the vulnerability is located in the entire source code.

Figure 9:
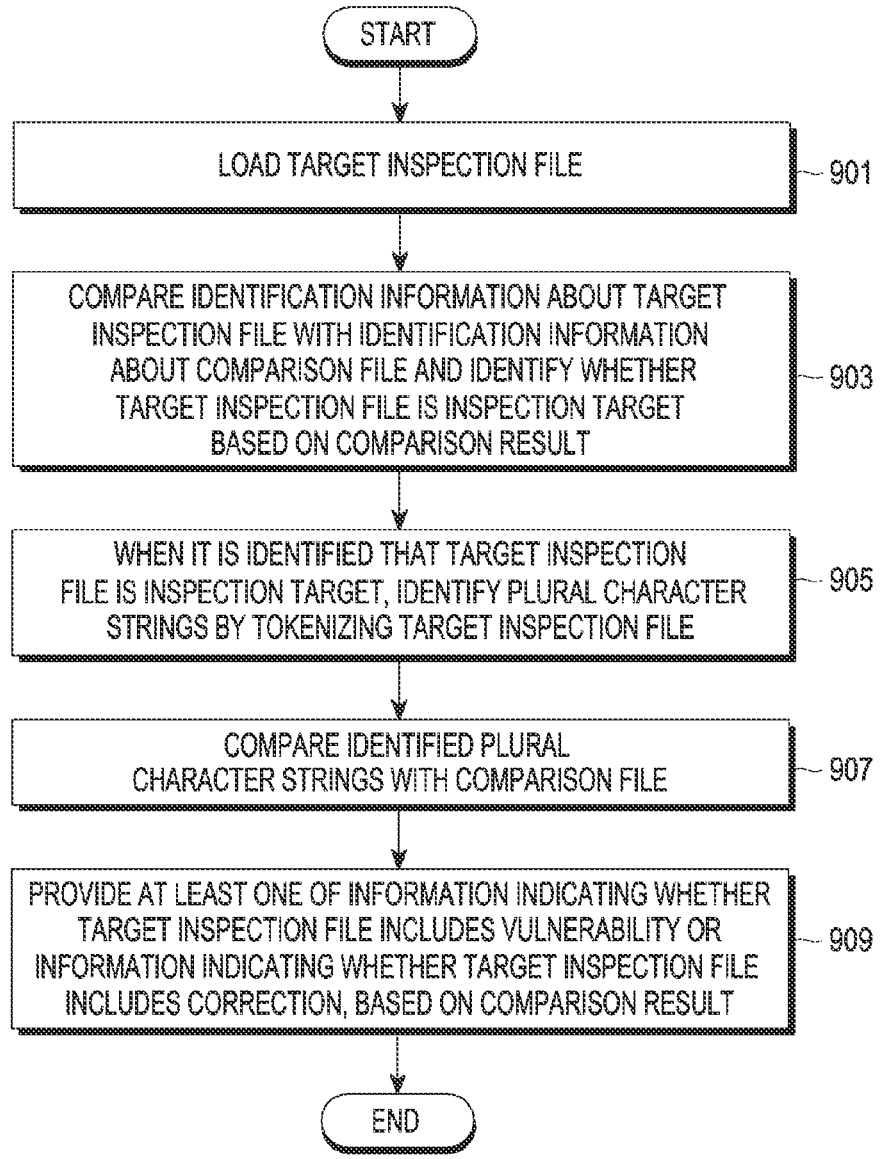
FIG. 9 is a flowchart illustrating a method of operating an electronic device according to various embodiments.

FIG. 9 is a flowchart illustrating a method of operating an electronic device according to various embodiments.

According to various embodiments, the electronic device 101 may load a target inspection file in operation 901. In operation 903, the electronic device 101 may compare identification information about the target inspection file with identification information about a comparison file to determine whether the target inspection file is an inspection target based on the comparison result. For example, the electronic device 101 may compare the file identification information about the comparison file as illustrated in Table 1 with the file identification information about the target inspection file. When the target inspection file is identified as the inspection target according to the comparison result, the electronic device 101 may tokenize the target inspection file to identify a plurality of character strings in operation 905. In operation 907, the electronic device 101 may compare the identified plurality of character strings with the comparison file. In operation 909, the electronic device 101 may provide at least one of information indicating whether the target inspection file includes a vulnerability or information indicating whether the target inspection file include a correction based on the comparison result.

FIGS. 10a, 10b, 10c, and 10d illustrate patch files, comparison files, and target inspection files according to various embodiments.

Figure 10A:
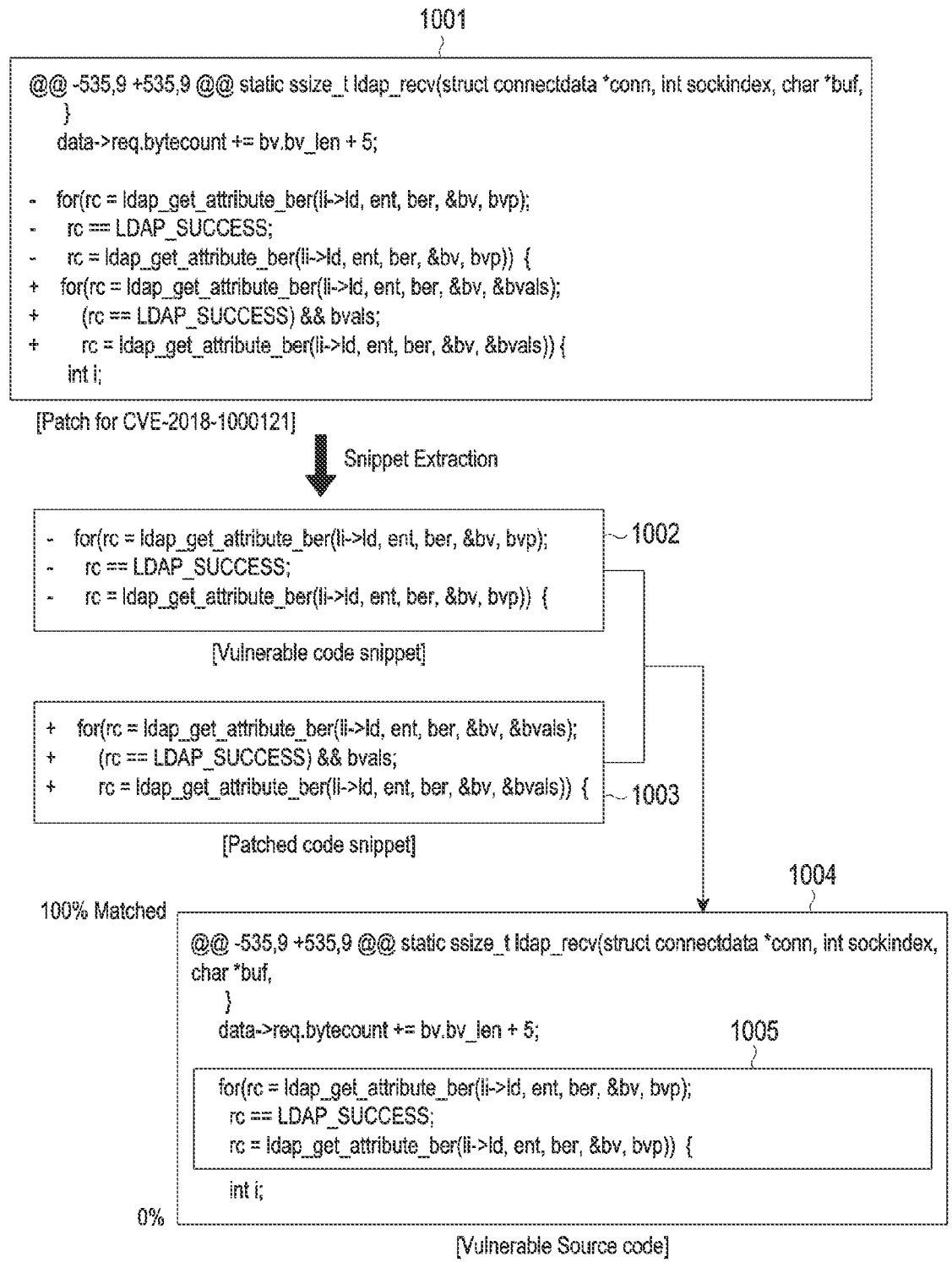
FIG. 10a is a diagram illustrating a patch file, a comparison file, and a target inspection file according to various embodiments.

Referring to FIG. 10a, the electronic device 101 may collect a patch file 1001 for correcting a vulnerability of CVE-2016-7167, for example. The electronic device 101 may parse character strings included in the patch file 1001 and classify the parsed character strings into a vulnerability 1002 and a correction 1003. The electronic device 101 may compare the character strings of the vulnerability 1002 with the character strings of a target inspection file 1004, and identify that all the character strings of the vulnerability 1002 are identical to at least a part 1005 of the character strings of the target inspection file 1004. Accordingly, the electronic device 101 may identify that the match rate between the vulnerability 1002 and the target inspection file 1004 is 100%. The electronic device 101 may display, for example, the source code of the target inspection file 1004 in a manner that distinguish the character strings 1005 identical to the character strings of the vulnerability 1002 from the other character strings. Further, the electronic device 101 may compare the correction 1003 with the character strings of the target inspection file 1004. The electronic device 101 may identify that no character strings of the target inspection file 1004 match the character strings of the correction 1003. Accordingly, the electronic device 101 may identify that the match rate between the correction 1003 and the target inspection file 1004 is 0%. The electronic device 101 may identify that the match rate 100% between the vulnerability 1002 and the target inspection file 1004 exceeds a threshold, and thus provide an analysis result indicating that the target inspection file 1004 needs to be patched or the target inspection file 1004 is a version prior to patch. Alternatively, the electronic device 101 may provide the match rate 100% between the vulnerability 1002 and the target inspection file 1004.

Figure 10C:
FIG. 10c is a diagram illustrating a patch file, a comparison file, and a target inspection file according to various embodiments.

In the embodiments of FIGS. 10b, 10c, and 10d, the electronic device 101 may collect patch files 1011, 1021, and 1031 for correcting vulnerabilities of CVE-2017-3735, CVE-2016-7167, and CVE-2014-3569, respectively. The electronic device 101 may classify vulnerabilities 1012, 1022, 1032 and corrections 1013, 1023, and 1033 from the collected patch files 1011, 1021, and 1031. In each of the embodiments of FIGS. 10b, 10c, and 10d, the electronic device 101 may identify that all character strings of the vulnerability 1012, 1022, or 1032 are identical to a part of a target inspection file 1014, 1024, or 1034. Therefore, the match rate between the vulnerability 1012, 1022, or 1032 and the target inspection file 1014, 1024, or 1034 may be identified as 100%. The electronic device 101 may identify that none of the character strings of a correction 1013, 1023, or 1033 are identical to the character strings of the target inspection file 1014, 1024, or 1034, and thus identify the match rate between the correction 1013, 1023, or 1033 and the target inspection file 1014, 1024, or 1034 as 0%. The electronic device 101 according to various embodiments may display character strings 1005, 1015, 1025, 1026, and 1035 corresponding to vulnerable codes distinguishably from the other character strings, as illustrated in FIGS. 10a, 10b, 10c, and 10d.

Figure 11A:
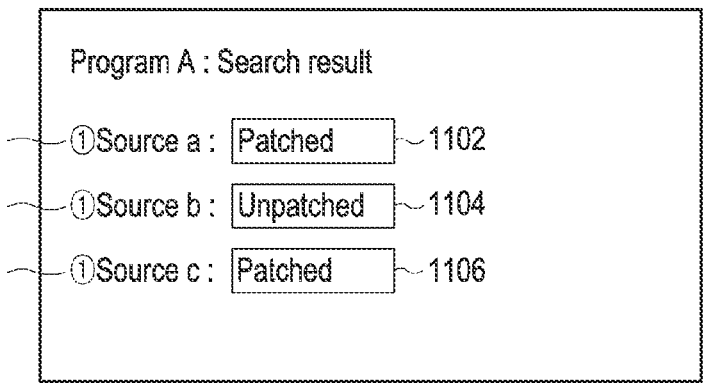
FIG. 11a is a diagram illustrating an exemplary screen provided by an electronic device according to various embodiments.
Figure 11B:
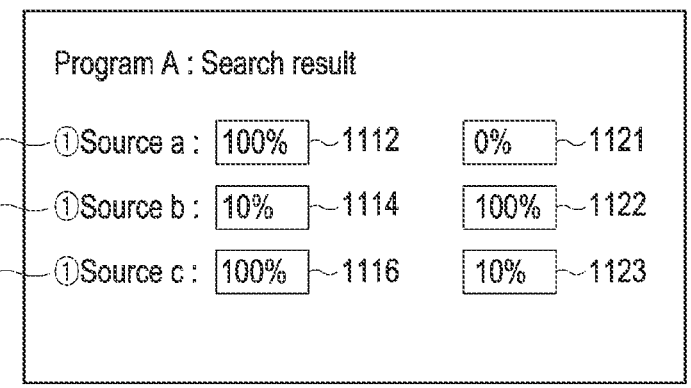
FIG. 11b is a diagram illustrating an exemplary screen provided by an electronic device according to various embodiments.

FIGS. 11a and 11b are diagrams illustrating exemplary screens provided by an electronic device according to various embodiments.

Referring to FIG. 11a, the electronic device 101 may display a first screen through, for example, the output device 160. The first screen may be intended to provide search results for program A. The first screen may include identification information 1101, 1103, and 1105 about at least one source code included in program A. The electronic device 101 may compare a first comparison file corresponding to a first source code (for example, Source a) with the first source code and display an object 1102 indicating whether the first source code has been patched based on the comparison result. The electronic device 101 may identify that the first comparison file is for comparison with the first source code by comparing file identification information about the first comparison file with file identification information about the first source code. For example, the electronic device 101 may identify that the rate of a correction of the first comparison file reflected in the first source code exceeds a threshold and thus identify that the first source code has been patched. The electronic device 101 may display the object 1102 indicating that the first source code has been patched at a position corresponding to the identification information 1101 about the first source code. The electronic device 101 may identify a second comparison file corresponding to a second source code (for example, Source b) and a third comparison file corresponding to a third source code (for example, Source c) by using identification information about the second source code and identification information about the third source code. The electronic device 101 may compare the second comparison file with the second source code and identify that the second source code includes a character string of a vulnerability included in the second comparison file based on the comparison result. The electronic device 101 may display an object 1104 that the second source code has not been patched at a position corresponding to the identification information 1103 about the second source code. The electronic device 101 may compare the third comparison file with the third source code and identify that the third source code includes a character string of a correction included in the third comparison file, not a character string of a vulnerability included in the third comparison file based on the comparison result. The electronic device 101 may display an object 1106 that the third source code has been patched at a position corresponding to the identification information 1105 about the third source code. The developer of program A may identify that the second source code of program A is a version prior to patch from the first screen. The developer of program A may adapt the electronic device 101 to apply a patch file to the second source code, thereby preventing program A from being released with the source code having an unpatched vulnerability. According to various embodiments, the electronic device 101 may automatically apply the patch file to the second source code identified as unpatched.

Referring to FIG. 11b, the electronic device 101 may display a second screen providing search results for program A. The second screen may include identification information 1111, 1117, and 1115 about at least one source code included in program A. The electronic device 101 may display objects 1112, 1114, and 1116 indicating the probabilities of the source codes being patched, at positions corresponding to the identification information 1111, 1117, and 1115. Each of the probabilities indicated by the objects 1112, 1114, and 1116 may be determined to be, for example, a ratio of the number of character strings commonly included in a correction and the source code to the total number of character strings included in the correction in the comparison file for the source code.

The electronic device 101 may display objects 1121, 1122, and 1123 indicating the probabilities of the source codes being unpatched at the positions corresponding to the identification information 1111, 1117, and 1115. Each of the probabilities indicated by the objects 1121, 1122, and 1123 may be determined to be, for example, a ratio of the number of character strings commonly included in a vulnerability and the source code to the total number of character strings included in the vulnerability in the comparison file for the source code.

Various embodiments as set forth herein may be implemented as software (e.g., a program) including one or more instructions that are stored in a storage medium (e.g., internal memory or external memory) that is readable by a machine (e.g., a computer). The machine may invoke at least one of the one or more instructions stored in the storage medium, and execute it. The machine may include an electronic device (for example, the electronic device 101) according to the disclosed embodiments. When the instruction is executed by a processor (for example, the processor 120), the function corresponding to the instruction may be executed, using other components under the control of the processor. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., PlayStore™). If distributed online, at least part of the computer program product may be temporarily generated or at least temporarily stored in the machine-readable storage medium, such as memory of the manufacturer's server, a server of the application store, or a relay server.

According to various embodiments, each component (for example, a module or a program) of the above-described components may include a single entity or multiple entities. According to various embodiments, one or more of the above-described components may be omitted, or one or more other components may be added. Alternatively or additionally, a plurality of components (for example, modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
an output device;
a memory; and
a processor operatively coupled to the memory and the output device,
wherein the processor is configured to:
store, in the memory, at least one source code and a comparison file including at least one of a correction or a vulnerability into which each of at least one character string included in a patch file corresponding to the at least one source code is classified;
load the at least one source code stored in the memory;
compare at least one first character string of the correction included in the comparison file corresponding to the at least one source code with a second character string included in the at least one source code;
identify a first match rate based on comparing the at least one first character string and the second character string;
compare at least one third character string of the vulnerability included in the comparison file with the second character string;
identify a second match rate based on comparing the at least one third character string and the second character string; and
provide at least one of information indicating whether the at least one source code has been patched, a probability that the at least one source code has been patched, or information about a vulnerability in the at least one source code, based on at least one of the first match rate or the second match rate.

2. The electronic device of claim 1,
wherein
the first match rate is a ratio of a number of first character strings included in the at least one source code to a total number of the at least one first character string included in the correction of the comparison file, and the second match rate is a ratio of a number of third character strings included in the at least one source code to a total number of the at least one third character string included in the vulnerability of the comparison file.

3. The electronic device of claim 1, wherein the processor is configured to:
based on identifying that the second match rate is greater than a first threshold, identify that the at least one source code has not been patched.

4. The electronic device of claim 1, wherein the processor is configured to:
as at least a part of providing the at least one of the information indicating whether the at least one source code has been patched, the probability that the at least one source code has been patched, or the information about the vulnerability in the at least one source code through the output device based on the at least one of the first match rate or the second match rate, provide the second match rate as the probability that the at least one source code has not been patched.

5. The electronic device of claim 1, wherein the processor is configured to:
based on identifying that the first match rate is greater than a second threshold, identify that the at least one source code has been patched.

6. The electronic device of claim 1, wherein the processor is configured to:
as at least a part of providing the at least one of the information indicating whether the at least one source code has been patched, the probability that the at least one source code has been patched, or the information about the vulnerability in the at least one source code through the output device based on the at least one of the first match rate or the second match rate, provide the first match rate as the probability that the at least one source code has been patched.

7. The electronic device of claim 1,
wherein the processor is configured to:
as at least a part of comparing the at least one third character string of the vulnerability with the at least one second character string, identify at least one partial character string identical at least partially to the at least one third character string included in the vulnerability of the comparison file, among the at least one second character strings included in the at least one source code, and
wherein the processor is configured to:
as at least a part of providing the at least one of the information indicating whether the at least one source code has been patched, the probability that the at least one source code has been patched, or the information about the vulnerability in the at least one source code through the output device based on the at least one of the first match rate or the second match rate, provide information about a position of the identified at least one partial character string.

8. The electronic device of claim 1,
wherein the processor is configured to:
as at least a part of comparing the at least one third character string of the vulnerability with the at least one second character string, identify at least one partial character string identical at least partially to the at least one third character string included in the vulnerability of the comparison file, among the at least one second character strings included in the at least one source code, and
wherein the processor is configured to:
as at least a part of providing the at least one of the information indicating whether the at least one source code has been patched, the probability that the at least one source code has been patched, or the information about the vulnerability in the at least one source code through the output device based on the at least one of the first match rate or the second match rate, display the at least one source code with the identified at least one partial character string being distinguishable from other character strings.

9. The electronic device of claim 1, wherein the processor is further configured to identify file identification information of the at least one source code, and identify the comparison file having file identification information corresponding to the file identification information of the at least one source code.

10. A method of operating an electronic device, the method comprising:
storing at least one source code and a comparison file including a correction and a vulnerability into which each of at least one character string included in a patch file corresponding to the at least one source code is classified;
loading the at least one source code stored in a memory of the electronic device;
comparing at least one first character string of the correction included in the comparison file corresponding to the at least one source code with a character string included in the at least one source code;

identifying a first match rate based on comparing the at least one first character string and the second character string;

comparing at least one third character string of the vulnerability included in the comparison file with the second character string;

identifying a second match rate based on comparing the at least one third character string and the second character string; and providing at least one of information indicating whether the at least one source code has been patched, a probability that the at least one source code has been patched, or information about a vulnerability in the at least one source code, based on at least one of the first match rate or the second match rate.

11. The method of claim 10, wherein the first match rate is a ratio of a number of first character strings included in the at least one source code to a total number of the at least one first character string included in the correction of the comparison file, and the second match rate is a ratio of a number of third character strings included in the at least one source code to a total number of the at least one third character string included in the vulnerability of the comparison file.

12. The method of claim 10, further comprising:
based on identifying that the second match rate is greater than a first threshold, identifying that the at least one source code has not been patched.

13. The method of claim 10, wherein providing the at least one of the information indicating whether the at least one source code has been patched, the probability that the at least one source code has been patched, or the information about the vulnerability in the at least one source code based on the at least one of the first match rate or the second match rate comprises:
providing the second match rate as the probability that the at least one source code has not been patched.

14. The method of claim 10, further comprising:
based on identifying that the first match rate is greater than a second threshold, identifying that the at least one source code has been patched.

15. The method of claim 10, wherein providing the at least one of the information indicating whether the at least one source code has been patched, the probability that the at least one source code has been patched, or the information about the vulnerability in the at least one source code based on the at least one of the first match rate or the second match rate comprises:
providing the first match rate as the probability that the at least one source code has been patched.

* * * * *